United States Patent
Mayer et al.

(10) Patent No.: US 7,348,874 B2
(45) Date of Patent: Mar. 25, 2008

(54) PACKET BOX ELECTRONIC DEVICE AND LOGISTIC SYSTEM

(75) Inventors: Boris Mayer, Bonn (DE); Christian Borger, Bonn (DE)

(73) Assignee: Deutsche Post AG, Bonn (DE)

( * ) Notice: Subject to any disclaimer, the term of this patent is extended or adjusted under 35 U.S.C. 154(b) by 138 days.

(21) Appl. No.: 10/821,107

(22) Filed: Apr. 8, 2004

(65) Prior Publication Data
US 2004/0236437 A1 Nov. 25, 2004

Related U.S. Application Data

(63) Continuation of application No. PCT/DE02/03761, filed on Oct. 7, 2002.

(30) Foreign Application Priority Data
Oct. 9, 2001 (DE) ................................ 101 49 637

(51) Int. Cl.
*H04Q 1/00* (2006.01)
(52) U.S. Cl. .................... 340/5.73; 340/5.5; 340/5.9
(58) Field of Classification Search ............... 340/5.73, 340/5.7, 5.9, 568.1, 572.1, 569, 539.1, 543, 340/5.5; 700/233, 244, 214, 237, 242; 235/382, 235/385, 381; 232/45, 19
See application file for complete search history.

(56) References Cited

U.S. PATENT DOCUMENTS

| | | | |
|---|---|---|---|
| 5,475,378 A | 12/1995 | Kaarsoo et al. | 340/825.34 |
| 6,456,900 B1 * | 9/2002 | Kakuta | 700/233 |
| 6,791,450 B2 * | 9/2004 | Gokcebay et al. | 340/5.73 |
| 6,879,243 B1 * | 4/2005 | Booth et al. | 340/5.73 |

FOREIGN PATENT DOCUMENTS

| | | |
|---|---|---|
| DE | 196 41 005 A1 | 12/1998 |
| DE | 199 39 211 A1 | 3/2001 |
| DE | 200 21 792 U1 | 4/2001 |
| DE | 100 00 830 A1 | 7/2001 |
| DE | 100 00 830 C2 | 7/2001 |
| FR | 2 713 461 | 6/1995 |
| RU | 1617645 | 12/1990 |
| WO | WO 00/51750 | 9/2000 |
| WO | WO 01/00069 A2 | 1/2001 |
| WO | WO 01/00069 A3 | 1/2001 |
| WO | WO 01/30213 A2 | 5/2001 |

OTHER PUBLICATIONS

International Search Report in PCT/DE02/03761 dated Aug. 5, 2003.
International Preliminary Examination Report in PCT/DE02/03761 dated Jan. 26, 2004.

* cited by examiner

*Primary Examiner*—Edwin C. Holloway, III
(74) *Attorney, Agent, or Firm*—Marshall, Gerstein & Borun LLP

(57) ABSTRACT

A device and system include a plurality of electronic boxes for packets, several electronic boxes being assigned to a control unit and a central control unit for monitoring the control units.

3 Claims, 12 Drawing Sheets

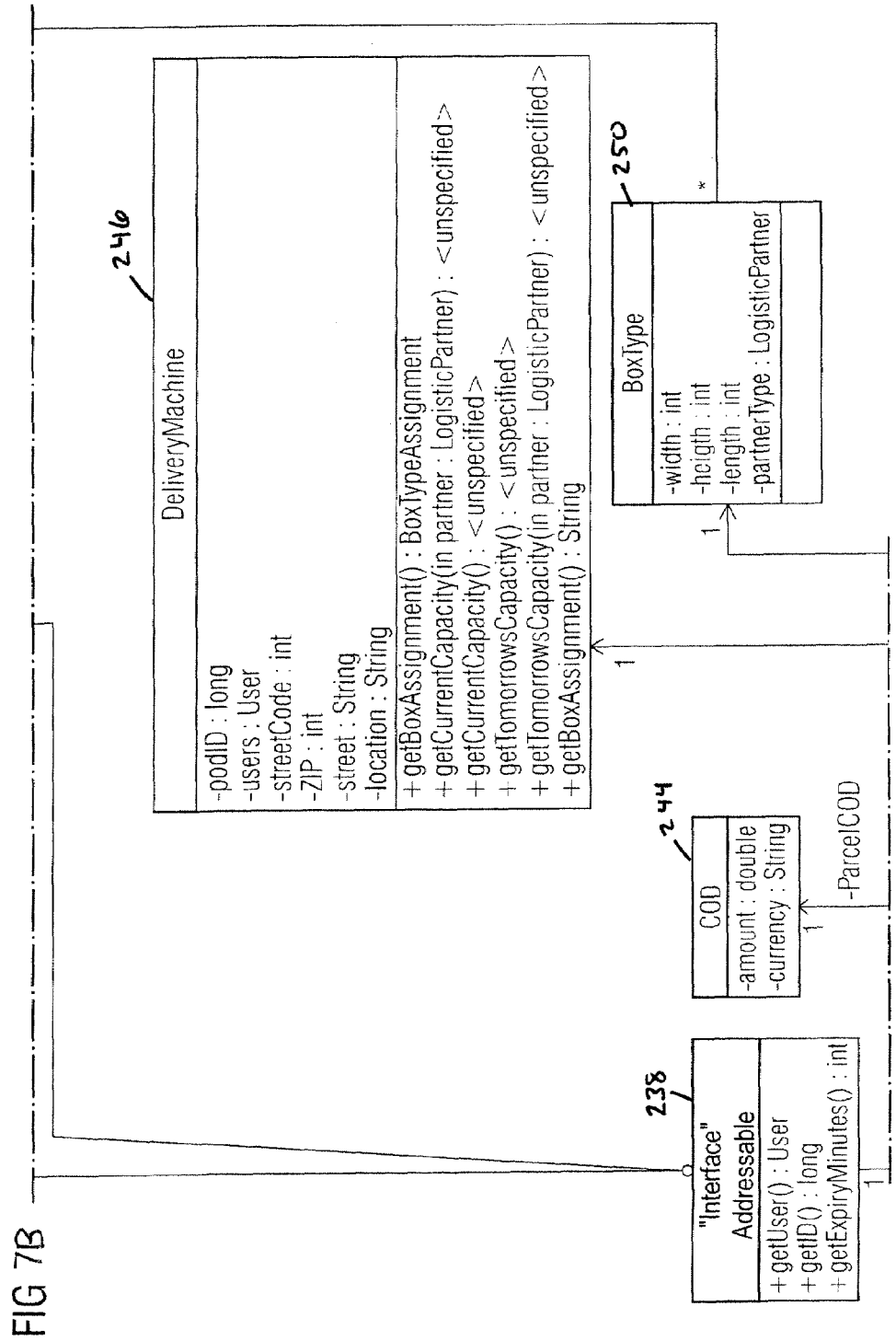

FIG 7C

```
                    *  ┌──────┐  *
                    ───┤Parcel├───
                    1  └──────┘  /242
```

- parcelID : long
- recipient : Addressable
- parcelType : String
- boxType : BoxType
- sender : String
- cod : COD
- identCode : long
- expiryDate : Date
- state : long
- deliveryTime : Date
- pickupTime : Date
- machine : DeliveryMachine
- substitute : Addressable
- pickedUpBy : User
- partnerType : LogisticPartner + getHistory()
+ notifyPickup(in eventTime : Date, in pickedUpBy : User, in mode : int)
+ getExpiryDate() : String
- substituteBy(jin addressable : Addressable)
+ create(in podID : DeliveryMachine, in eventTime : Date, in parcelID : long, in partnerType : LogisticPartner, in parcelType : String, in indentcode : long, in customer : Addressable, in mode : Int, in cod : COD, in ????
+ create(in podID : DeliveryMachine, in eventTime : Date, in parcelID : long, in partnerType : LogisticPartner, in parcelType : String, in customer : long, in customer : Addressable, in mode : Int, in boxType, in ???
+ create(in podID : DeliveryMachine, in eventTime : Date, in parcelID : long, in partnerType : LogisticPartner, in parcelType : String, in indentcode : long, in customer : Addressable, in mode : Int, in cod : COD, in ????
+ getRecipients() : User
+ getSubstitutes() : User
+ getProfiles() : String

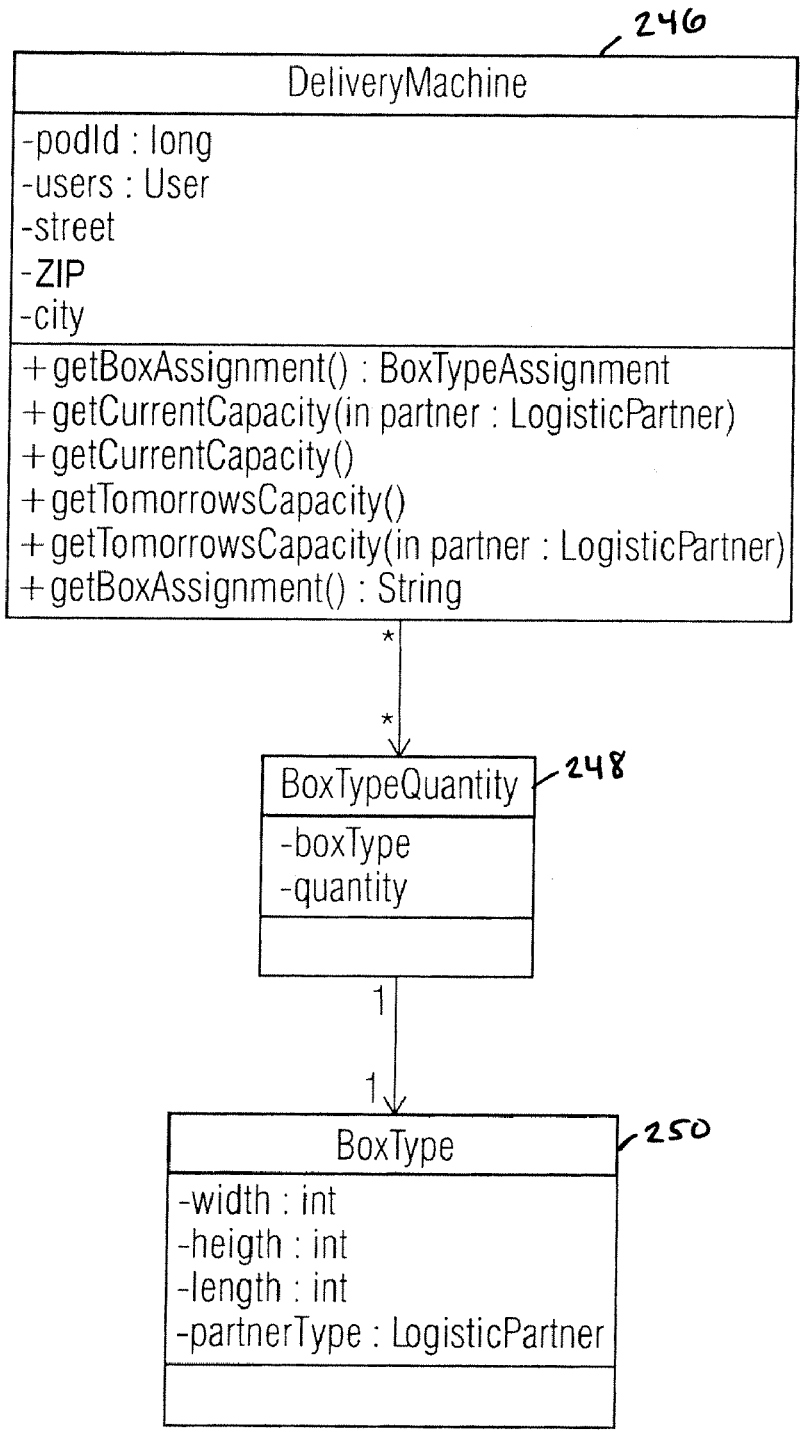

PACKET BOX ELECTRONIC DEVICE AND LOGISTIC SYSTEM

CROSS REFERENCE TO RELATED APPLICATION

This is a continuation of International Application No. PCT/DE02/03761 filed Oct. 7, 2002, the disclosure of which is incorporated herein by reference.

BACKGROUND OF THE DISCLOSURE

1. Field of the Disclosure

The disclosure generally relates to an electronic parcel box system.

2. Brief Description of Related Technology

Electronic parcel box systems are known, for example, from DE 100 00 830 A1, which discloses a method for depositing goods into at least one locker. The parcel box system used for this method has several parcel boxes that are opened and closed by means of an electronic locking system. Several parcel boxes are associated with an operating unit in the form of a terminal for reading in or outputting data. The locking system and the operating units are connected to a computer that controls the parcel box system. This publication also discloses a networking of the computers of several locker systems to form a multi-computer system having a central administration computer. The administration computer belongs, for example, to a delivery service that monitors all movements of goods in the locker compartments.

SUMMARY OF THE DISCLOSURE

Disclosed herein is an electronic parcel box system that allows flexible delivery and pick-up of parcels from parcel box systems.

Accordingly, such an electronic parcel box system is configured in such a way that it includes a plurality of electronic parcel boxes, whereby in each case, several parcel boxes are associated with an operating unit, and a central control unit is provided for controlling the operating units, whereby the central control unit has a means for flexibly associating the parcel boxes with the operating units.

The electronic parcel box system includes several individual delivery devices, whereby the delivery devices are equipped with one or more operating units. Several or all of the operating units are controlled by the central control unit.

It is advantageous for the operating units to include a control means for controlling the opening and/or the closing of the parcel boxes associated with the operating units.

The individual electronic parcel box systems are joined together to form clusters. In particular, it is advantageous for the central control unit to have a means for associating the parcel box systems with the operating units. The embodiment in which the parcel boxes and the operating units are associated with each other via the central control unit has the advantage that, in this manner, the electronic parcel box system can easily be adapted to changed operating parameters. It also is advantageous for the association of the parcel boxes with the operating units to be variable. In this manner, it is possible, for example, that, if an operating unit malfunctions, parcel boxes that had been associated with this operating unit until then can be associated with another operating unit.

In an especially preferred embodiment, the electronic parcel box system is configured in such a way that the central control unit has an interface for receiving information from a database server that contains filling data. In this way, the electronic parcel box system can be flexibly adapted to operating situations and user habits. For example, if an operating unit malfunctions, the parcel boxes that had been associated with this operating unit until then can be associated with one or more other operating units. This, too, enhances the flexibility to adapt to the needs or habits of users of the parcel box system.

Especially preferred embodiments allow internal communication between the central control unit and the operating units as well as external communication between the central control unit and one or more database servers. In an advantageous embodiment, such an integration of the data communication takes place in such a way that the central control unit has an interface for transmitting information to a database server that has been provided with filling data. Moreover, it is advantageous to equip the central control unit with additional interfaces for checking and/or changing operating states. This makes the electronic parcel box system particularly easy to maintain. Another enhancement in the flexibility and versatility of the electronic parcel box system can be achieved in that the central control unit has a computer that can store and process operating data and/or the filling status of the parcel boxes.

The term "computer" is not to be construed in any limiting manner, as it refers to any unit that is capable of executing computations, for example, a work station, a personal computer, a microcomputer or a circuit that is suitable for executing computations and/or comparisons.

Also disclosed herein is a logistic system that is characterized in that it contains several electronic parcel box systems networked with each other. Such a logistic system constitutes an especially preferred way to allow a flexible delivery and pick-up of parcels from parcel boxes. By networking several electronic parcel box systems, it is especially possible to deliver mailpieces in a particularly flexible manner. Thus, for example, if all of the parcel boxes of a given electronic parcel box system are occupied, it is possible to transport additional mailpieces to another electronic parcel box system and to keep them ready for pick-up there. By integrating a preferably centrally-operated database server, parcel shipments can be delivered to the electronic parcel box systems as a function of the filling status of the electronic parcel box system and/or of the parcel boxes contained therein.

Additional features of the disclosure may become apparent to those skilled in the art from a review of the following detailed description, taken in conjunction with the drawing figures, the examples, and the appended claims.

BRIEF DESCRIPTION OF THE DRAWINGS

For a more complete understanding of the disclosure, reference should be made to the following detailed description and accompanying drawing wherein:

FIGS. 7, 7A, 7B and 7C are a detailed view of interfaces used for the filling and administration of parcel boxes;

FIG. 8 is a detailed view of interfaces used for the configuration of delivery machines and the capacity utilization; and, FIG. 9 shows process steps for correcting errors.

Figure 1:
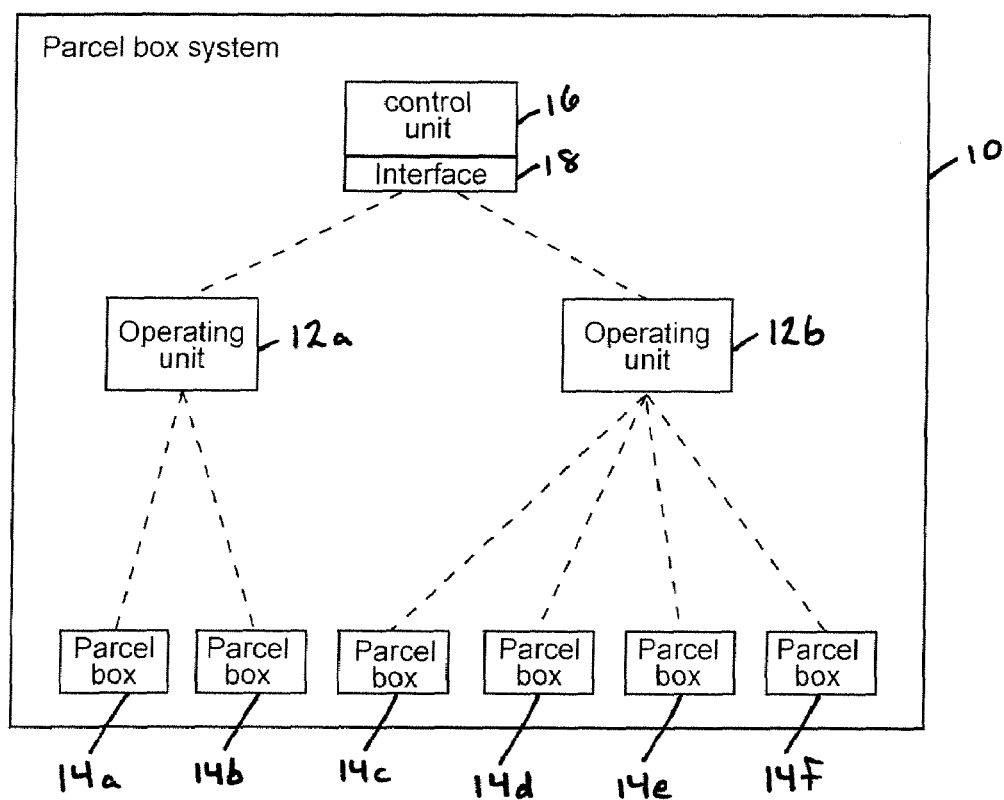
FIG. 1 illustrates an example of an electronic parcel box system.

While the disclosed device and system are susceptible of embodiments in various forms, there are illustrated in the drawings (and will hereafter be described) specific embodiments of the disclosure, with the understanding that the disclosure is intended to be illustrative, and is not intended to limit the disclosure to the specific embodiments described and illustrated herein

DETAILED DESCRIPTION

Figure 2:
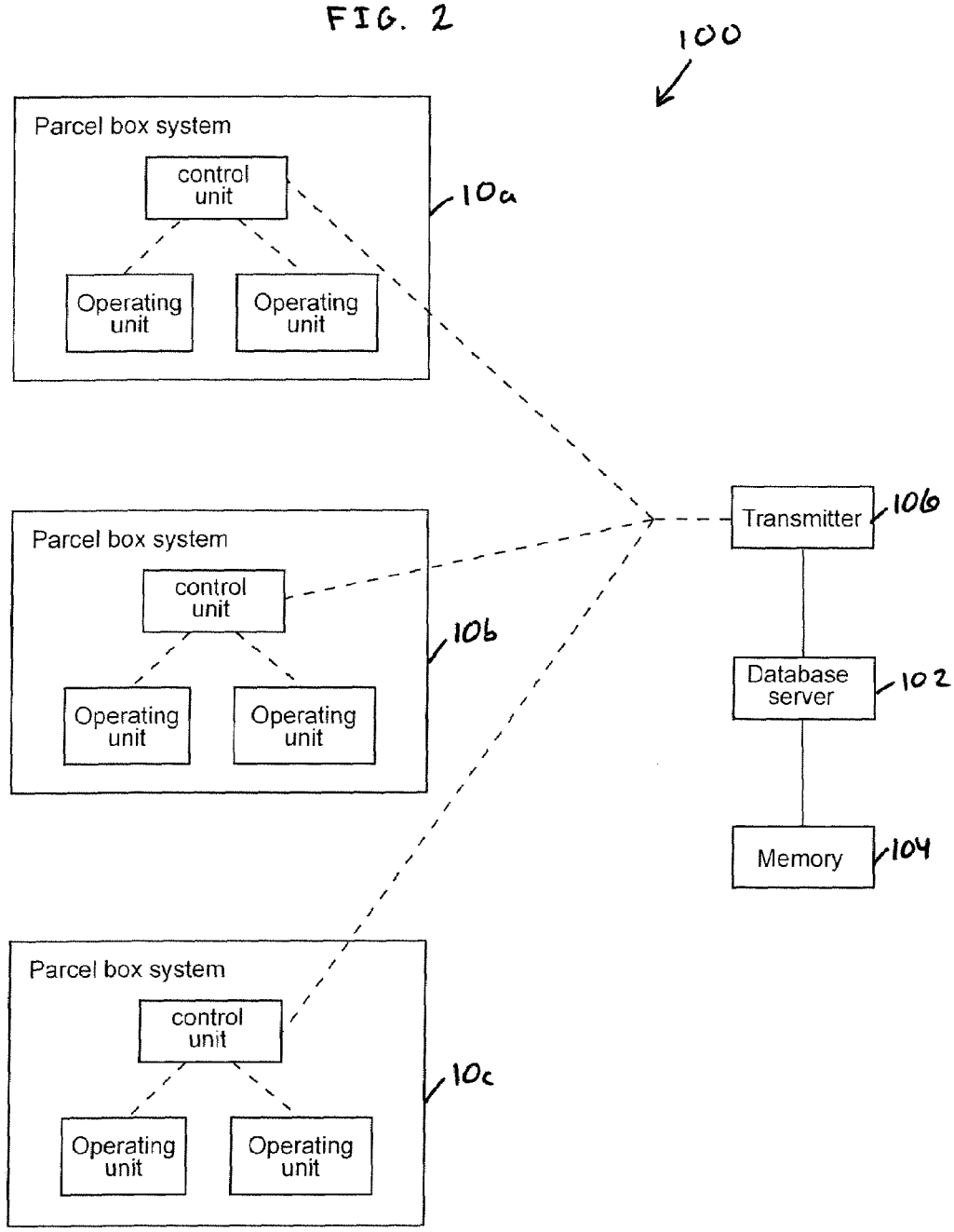
FIG. 2 illustrates an example of an logic system that includes several electronic parcel box systems.

Referring generally to FIGS. 1 and 2, disclosed herein is an electronic parcel box system 10 that includes operating units 12a, 12b, a plurality of electronic parcel boxes 14a-14f, several of which are associated with the operating unit 12a, 12b, and a central control unit 16 for controlling the operating units 12a, 12b. The control unit 16 includes an interface 18 for flexibly associating the parcel boxes 14a-14f with the operating units 12a, 12b. The parcel boxes 14a-14f associated with a malfunctioning operating unit can be associated with another operating unit. Also disclosed herein is a logic system 100 that includes several electronic parcel box systems 10a, 10b, 10c networked with each other, a central database server 102 that includes memory 104 for storing data about the filling status of the parcel box systems 10a, 10b, 10c and a transmitter 106 for transmitting the data, and a device for delivering postal parcels to individual electronic parcel box systems 10a, 10b, 10c as a function of the filling status of the electronic parcel box systems 10a, 10b, 10c.

The embodiment presented below shows the integration of the electronic parcel box system 10 into a comprehensive logistic system 100. Such an integration of the electronic parcel box system 10 into a comprehensive system is especially advantageous since in such a case, the flexibility attained with the set-up of the electronic parcel box systems 10a, 10b, 10c according to the disclosure allows them to be used especially efficiently.

Although such a use of the parcel box systems 10a, 10b, 10c in the comprehensive logistic system 100 is especially preferred, as a matter of principle, the electronic parcel box systems 10a, 10b, 10c can also be operated without being networked. In these embodiments as well, the integration of the central control unit 16 for controlling the operating units 12a, 12b makes the electronic parcel box systems 10a, 10b, 10c more flexible to use. However, the application possibilities for the disclosed system are even further augmented by networking multiple parcel box systems 10a, 10b, 10c with each other and/or with the preferably centrally operated database server 102. When several of these advantageous components are integrated, the result is a comprehensive system having the following constituents, which are also referred to below as postal service customers (e.g., "Post24") since it is possible to achieve automated, round-the-clock operation:

1. Multiple parcel dispensing units that preferably each have at least one operating unit 12a, 12b.

2. A central control unit 16 with which the individual delivery machines are networked in clusters and which monitors the operating states and functions of the delivery machines. The central control unit 12 serves as a "concentrator" for the parcel transactions that it forwards to the server of the postal service customers. Moreover, the central control unit 12 distributes the operating instructions of the server of the postal service customers to the parcel delivery machines.

3. The server 102 of the postal service customers that administers the customer and parcel data and that registers and controls the procedures of the delivery machine and that operates the central program applications (registration, Call-Center, Track&Trace, etc.).

The system has a modular design. A standardized interface is defined that regulates the communication between the delivery machine, or the CallCenter, and the server of the postal service customers. In this manner, delivery machines made by different manufacturers can be incorporated. The modular design of the individual parcel box systems 10 is especially well-suited in terms of increasing the flexibility and versatility of the individual electronic parcel box systems 10 as well as of the comprehensive logistic system 100. Preferably, the electronic parcel box systems 10 used in the logistic system 100 are structured in such a way that they execute the functions and operating contents of the comprehensive logistic system 100 in an especially effective and efficient manner.

As a matter of principle, the electronic parcel box systems 10 can be implemented in the form of numerous different technical solutions. The embodiments of electronic parcel box systems 10 presented below, however, are particularly well-suited in view of their reliability and user-friendliness. One of the two systems is characterized in that the parcel boxes 14a-14f can each be individually closed with a door. Another, likewise preferred, configuration of the embodiment of the parcel box system 10 is characterized by a cyclic elevator system with special transport mechanisms for individual boxes for purposes depositing and removing the individual parcels.

In the embodiments shown, the delivery machine allows loading and picking-up of parcels or of contents via differently sized parcel boxes. An especially preferred feature of the delivery machine system is that parcel boxes are only temporarily associated with certain recipients, namely, only when the box contains something for that specific recipient. For this purpose, first of all, the potential recipient should be known to the delivery machine system and secondly, the shipments should be administered centrally and so as to be recipient-related.

During the loading procedure, a parcel identification code and a recipient identification code are detected. On the basis of the recipient identification code, the matching access code is requested from the server of the postal service customers (central system). When the parcel is picked up, the person doing so identifies himself with his personal recipient identification code, for example, using a magnetic card and the secret personal access code. If this information matches the information stored in the delivery machine, the contents of a box are released to the recipient. If it is a cash-on-delivery ("COD") parcel or if a sum of money has to be collected when the parcel is handed over, then the amount is first displayed and the person picking it up can pay this amount via a payment terminal (e.g., a credit card, cash card, etc.).

Parcels (or goods) that are being returned by recipients are detected by the delivery machine and reported to the server of the postal service customers, which initiates the pick-up procedure by the appropriate logistics personnel.

Advantageously, the central control unit 16—which is also called a control panel—has the properties described below.

The individual delivery machines are networked via the central control unit 16 that clusters and combines the communication ("concentrator"). Service and maintenance tasks are monitored via the central control unit 16. The central control unit 16 recognizes whether delivery machines or components of the delivery machine (operating unit, printer, individual boxes) are ready for operation and which operating events are taking place in the various delivery machines.

The server of the postal service customers is a data server that is networked via Internet-based web technology with the delivery machines, or with the control panel 16. The server of the postal service customers is an interface to additional database applications, which, for example, allow an integration of invoicing and shipment tracking functions.

The delivery machine is preferably only used by recipients who have previously signed up with the postal service entity (e.g., Deutsche Post) for this service and whose data is stored on the server of the postal service customers. The recipients who are thus registered receive a recipient identification code that they are supposed to use as part of their address information and they also receive a personal secret access code. Once a delivery has been made to the delivery machine, the recipient is automatically notified by the server of the postal service customers. The notification is preferably given electronically, for example, by sending an SMS message or an e-mail message. However, it is likewise possible for a letter to be automatically printed and sent to the recipient. The recipient can then pick up the parcel at the delivery machine at his own convenience. If this is not done within a certain period of time, a reminder is sent and, once the delivery period has lapsed, the parcel is made ready to be returned to the sender.

The parcel pick-up system is suitable for various areas of application. On the one hand, this delivery machine system can deliver normal parcels for final customers, but on the other hand, it can also meet special requirements of business customers.

Thus, a fixed or variable portion of the delivery machine parcel boxes can be rented for business partners and customers of the logistic company employing the system so that these customers can use the system accordingly. The delivery machine system is thus a central depot for these customers and the stock of goods and movement of goods in this depot can be controlled centrally and invoiced accordingly. In particular, this is a system consisting of centralized and decentralized components in order to achieve an intelligent, demand-based ordering and delivery system. The system comprises various components and interfaces that effectively and flexibly achieve a logistic system with delivery and service capabilities that have not been possible up until now.

Examples of functions that are integrated into the system are: parcel data management; user data management; registration of customers; B2B partner management; tracking of packages; management of the delivery machine configuration; capacity planning; notification; statistical data evaluation; delivery machine interface; and, in-house service.

It is advantageous to make a distinction between basic management components and the access to the parcel data and user data as well as to secondary components that map the business processes into the system.

The modular structure of the system allows an independent incremental development of the various services.

Since an especially preferred embodiment of the system and its components is based on an implementation of EJBs (Enterprise JavaBeans) technology, the basic components are mapped onto parcel EJBs and User EJBs. All other components communicate with these EJBs when they have to request or change parcel and customer data. The secondary components are, in part, complex partial systems that are made up of classes, EJBs and graphical user interfaces (GUIs). In order to allow communication of the components that is independent of the component design, each component provides a binding interface to its services in the form of a facade object—or EJB. The interfaces of the various components are described below.

Delivery Machine Interface:

The delivery machine interface is the communication platform with the delivery machines. The interface receives requests from the delivery machine and forwards them to the pertinent components. If the delivery machine expects data in response to its request, then this data are returned to the interface by the components and subsequently forwarded to the delivery machine.

Figure 3:
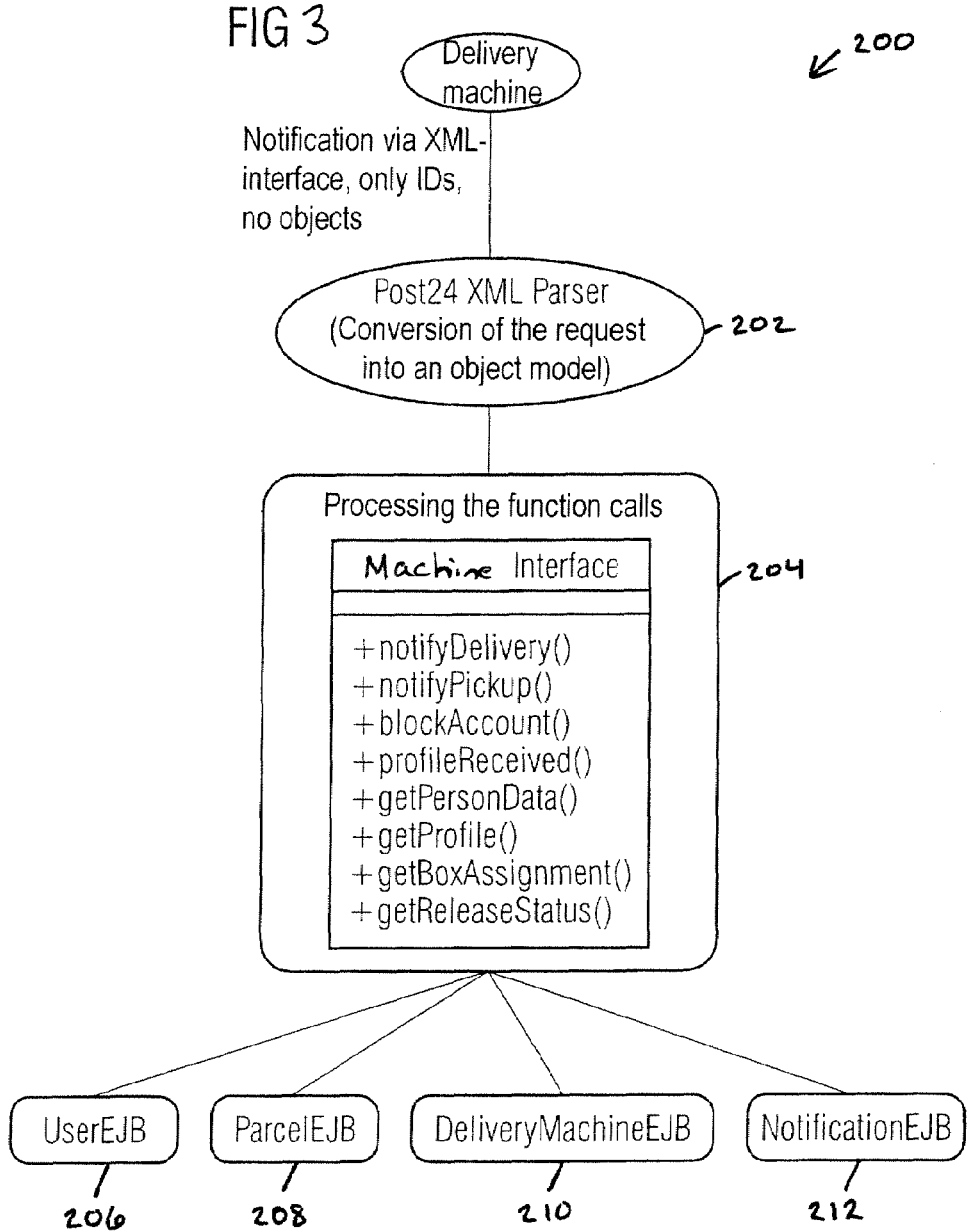
FIG. 3 illustrates the structure of a delivery machine interface suitable as a communication platform with the electronic parcel box system.

FIG. 3 shows the structure 200 of the components. An XML parser 202 carries out the mapping of the XML files that are sent per http post into the function procedure calls that can be interpreted by the logistic system 100 of the Machine Interface class, evaluates the function procedure calls 204, and forwards them to the pertinent components, namely, User 206, Parcel 208, DeliveryMachine 210, and Notification 212.

Figure 4:
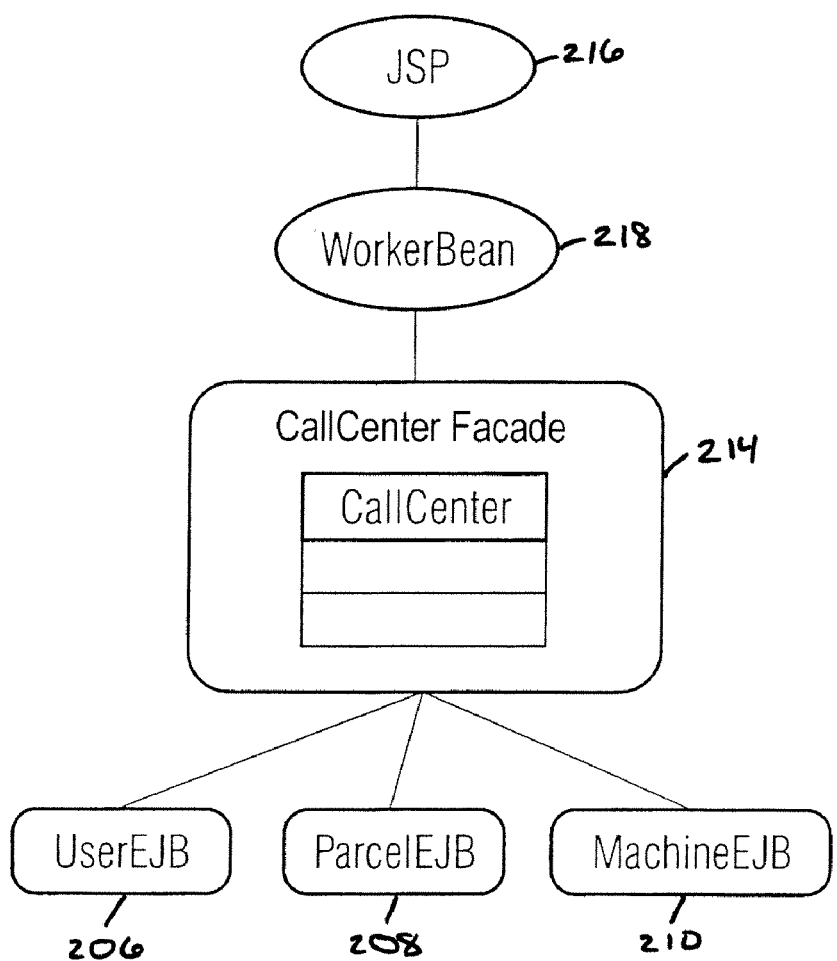
FIG. 4 is a schematic diagram of components used for user registration, user assistance, and shipment tracking.

Referring to FIG. 4, the components User Registration, B2B Partner Management, and Parcel Tracking are preferably encapsulated in a CallCenter façade 214. The façade 214 takes over the communication with the EJBs for user and parcel data management, that is to say, User 206 and Parcel 208. The component makes available web-based GUIs for registering and parcel tracking. These are encoded in JSP 216. Actions by the users are translated by means of a Worker Bean 218 into function procedure calls and forwarded to the CallCenter façade 214. Preferably, it is the CallCenter façade 214 that only now takes over the execution of the business logic circuit. The graph presented below provides a rough overview of this scenario.

Figure 5:
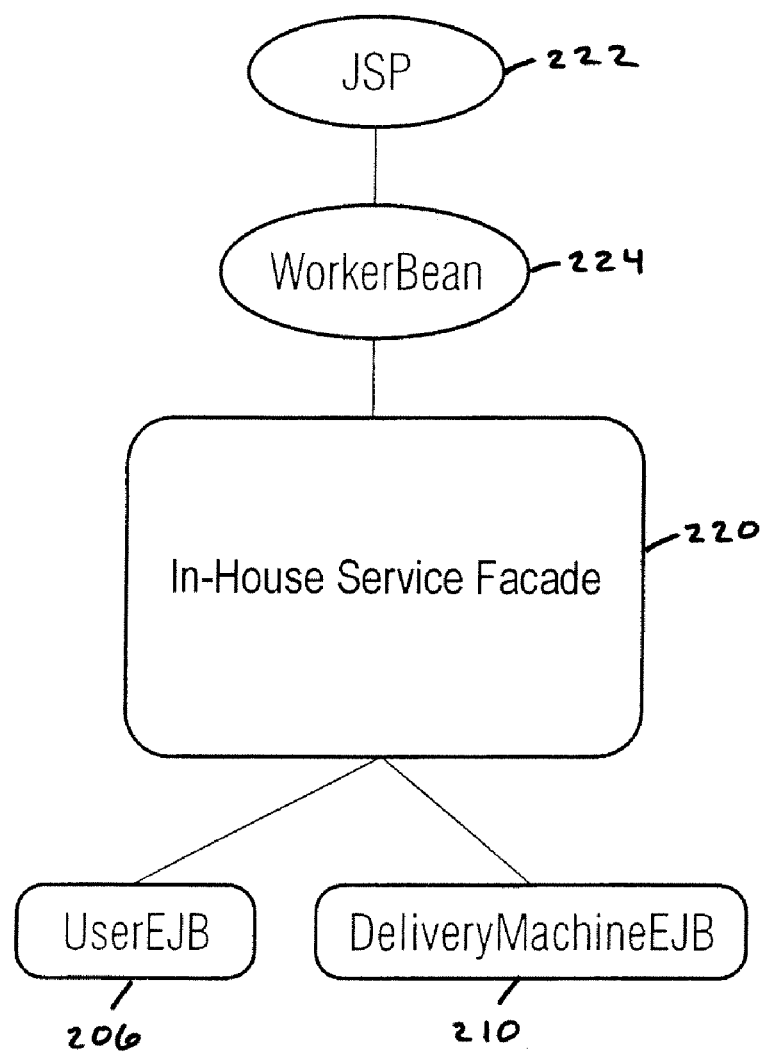
FIG. 5 is a schematic diagram of function procedure calls for the implementation of in-house service functions.

Referring to FIG. 5, the In-House Services component 220 encapsulates the services provided by the logistic system 100 for the in-house service into the delivery bases. At the interface to the employees of the in-house service, there is a JSP 222 that implements the GUI. Actions by the in-house employees are translated by means of a Worker Bean 224 into function procedure calls and forwarded to the In-House Service façade 220. The In-House Service façade 220 thus forms the interface to the actual function logic circuit of the component. The In-House Service façade 220 also constitutes the communication interface to the other components of the system. In order to map the required function logic circuit, the component needs access to the basic components, namely, User 206 and DeliveryMachine 210.

The structure of the component is disclosed in FIG. 5.

Another component that, thanks to the modular structure of the logistic system 100, can be installed without any problems and that advantageously improves the logistic system 100 and the components used therein, especially the parcel box system 10, is a notification component. The notification component effectuates the sending of messages to the user of the logistic system. The component preferably has two tasks. It maps the notification regimen of the logistic partners and takes over the technical transmission of messages to the devices of the customers.

Figure 6:
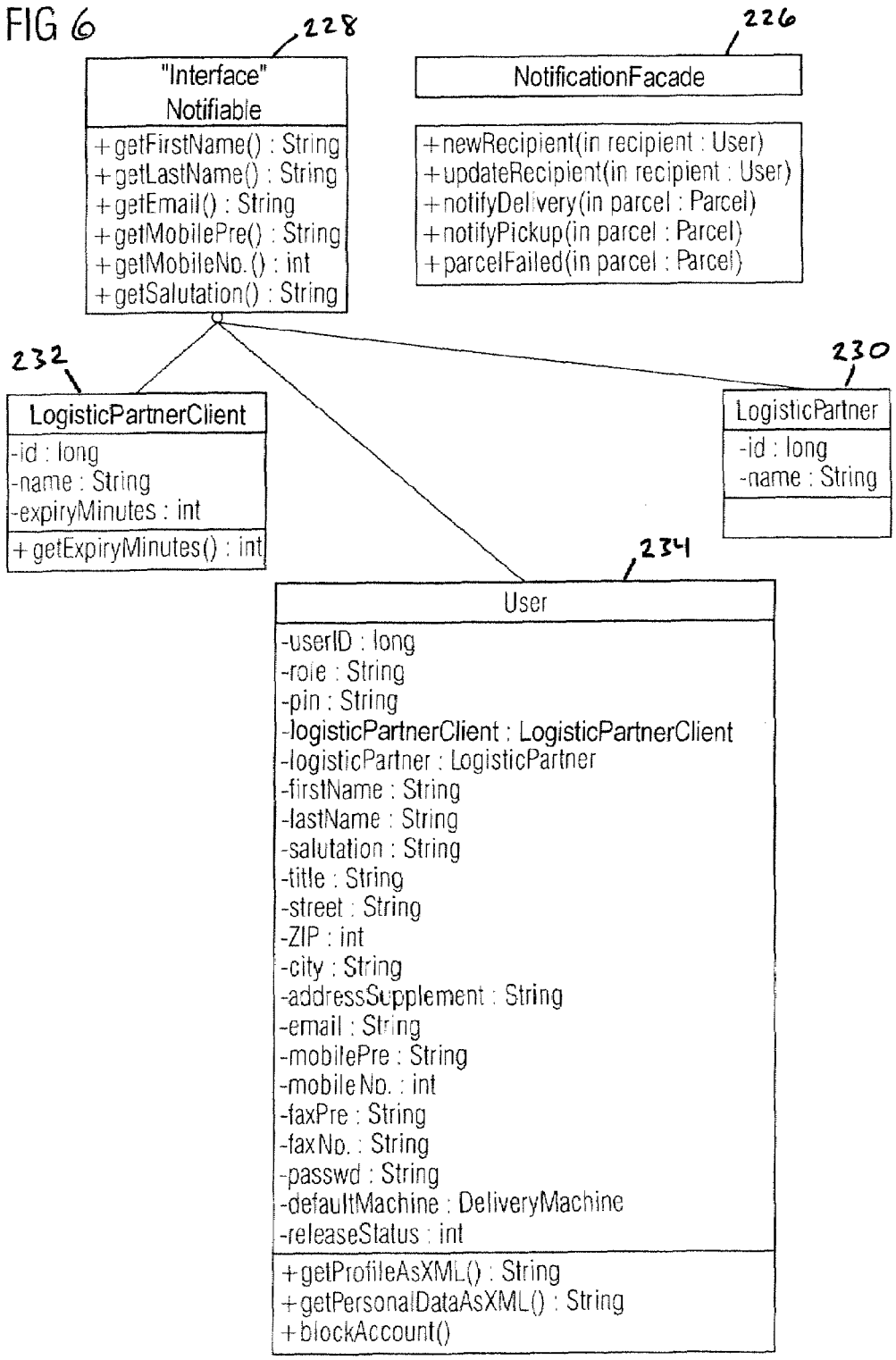
FIG. 6 is a schematic diagram of interfaces employed for user notification.

Referring to FIG. 6, the interface to the other components of the system is implemented by a facade class called NotificationFacade 226. This class provides numerous methods that serve to inform the component about events that can trigger a notification being sent to a user. At the present time, such events are triggered by the interface component as the result of an action at the delivery machine and of the registration component. In order to be able to configure the target and the content pertaining to the message, the component needs to have access to address data of the message recipient. All of the message recipients managed in this especially preferred embodiment of the logistic system 100 should thus make available the Notifiable interface 228. These are, for example, the EJBs of a postal service provider (referred to herein as "LogisticPartners") 230, the EJBs of customers of the postal service providers (referred to herein as "LogisticPartnerClient") 232, and the EJBs of User 206.

The organization of the user and parcel data can be carried out in many different ways. A user and parcel management system in the form of an object-oriented model (object model) that can be implemented especially advantageously will be presented below.

The central object of the object model for the user management is the EntityBean UserEJB 206, which stores all data on persons who are permitted to operate the delivery machine. Final customers as well as deliverers and service personnel are classified as users. A complex object model (person as basic class, derived classes for the various roles of the person) was dispensed with.

This yields the preferred embodiment, namely, to place the role of the user into the object as an attribute. The role is defined as "int." In the Const class, expressive variable names are defined, for example:

```
public class Const {
    ...
    static final int ROLE_DPAG_RECIPIENT = 1;
    ...
}
```

Moreover, the user object should have a reference to the associated LogisticPartners 230 or LogisticPartnerClient 232. LogisticPartners 230 are, for example, the postal service provider that operates the logistic system, or other companies that are given access to components of the logistic system, including the loading of the parcel boxes. LogisticPartnerClients 232 are the customers of a LogisticPartner 230, that is to say, for example, Telekom as a customer of Danzas.

Depending on the role of the user, the object receives a reference to a LogisticPartner (ROLE_B2B_DELIVERY_AGENT) or to a LogisticPartnerClient (ROLE_B2B_RECIPIENT). In each case, the other reference remains empty (It is never permissible for both references to be filled in at the same time since a person is either delivering or picking up a shipment, never both).

Figure 7:
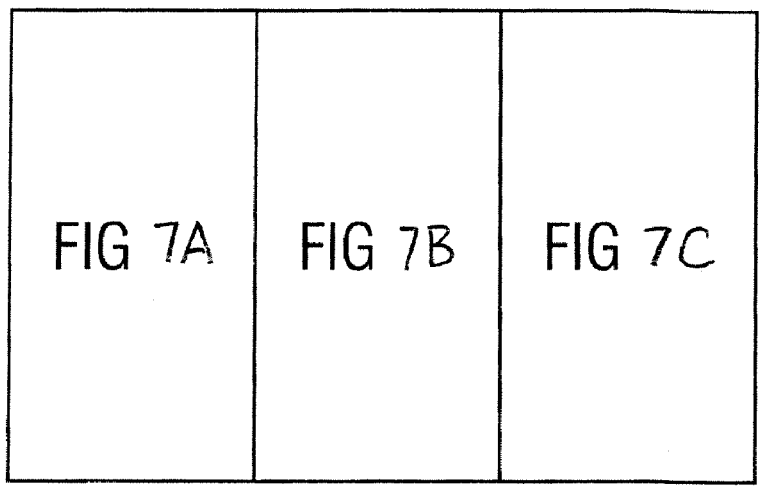
Figure 7A:
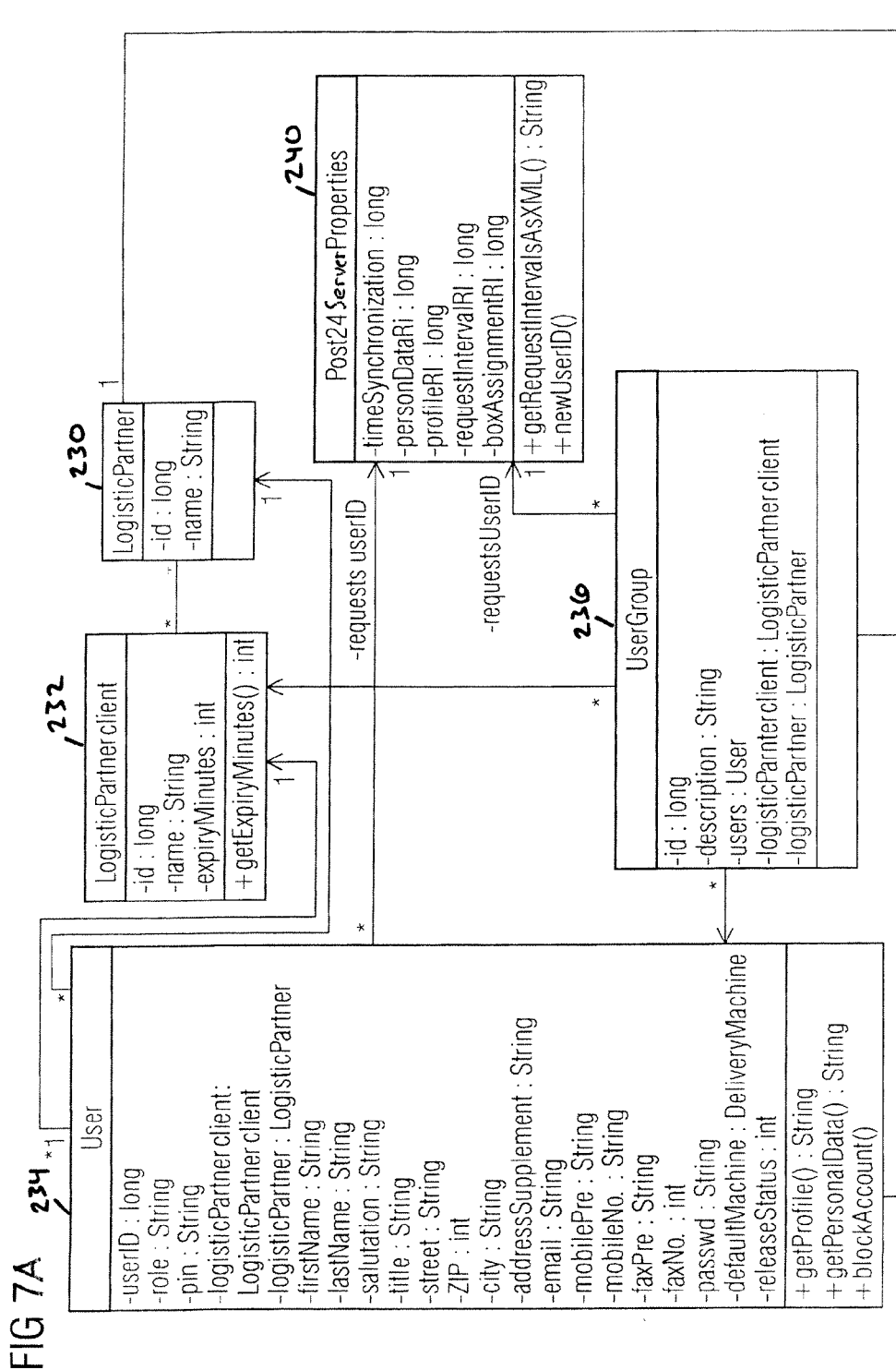

Referring to FIGS. 7 and 7A, a UserGroupEJB object 236 (likewise an EntityBean) allows the combination of several users into one group. In addition to a list of users, the UserGroup 236 has a reference to the LogisticPartner 230 or to the LogisticPartnerClient 232 to which all members of the groups belong. The redundant storage of the reference in the User 234 as well as in the UserGroup 236 simplifies the access to information in the LogisticPartner(Client) 230, 232.

Referring to FIGS. 7 and 7B, since parcels can be sent to both types (User 234 and UserGroup 236), the two objects implement the Interface Addressable 238. The interface 238 has the following methods: getUsers( ), getID( ) and getExpiryMinutes( ). This ensures that parcels that are sent to an addressable can be processed by the server.

The getUsers( ) method yields a list of user EJBs. If it is a UserGroup 236, this list contains several EJBs, and if it is a User 234, only one EJB is present.

The getID( ) method returns the ID of the User 234 or of the UserGroup 236. Since the addressable has to be able to be permanently stored, the subordinate object can be found through this ID. This results in the request that the IDs for the User 234 and UserGroup 236 be taken from a set of numbers. Moreover, referring again to FIG. 7A, in the object Post24ServerProperties 240, there is the newUserID( ) method. It returns an unambiguous continuous ID. Internally, this method accesses a database application, especially an Oracle sequence.

Referring back to FIG. 7B, the getExpiryMinutes( ) method in the addressable 238 is needed in order to determine the ExpiryDate of the parcel. The permitted retention time of a parcel depends on the client. In order to calculate the ExpiryDate, the getExpiryMinutes( ) method in both objects User 234 and UserGroup 236 accesses the LogisticPartnerClient.getExpiryMinutes( ) method and adds this permissible retention time to the current point in time.

The User 234 and the UserGroup 236 are created by the registration or by the administration tool.

Referring to FIGS. 7 and 7C, the EntityBean Parcel 242 is provided in order to manage the parcels. The ParcelID is issued by the delivery machine and the server is notified via the interface with notifyDelivery( ). Then the delivery machine facade creates a new Parcel Object with the ParcelID as the Primary Key.

The recipient (transmitted in the form of a customer number) is stored as addressable. In addition to the recipient, there is the substitute attribute, likewise of the addressable type. It cannot be set at notifyDelivery( ) but rather at a later point in time by calling the substituteBy method (addressable Addressable). The substitute arrangement is mapped by means of this attribute. The Parcel Object offers the following methods: getRecipients( ) and getsubstitutes( ), each of which returns a list of User Objects.

In generating a new Parcel Object, for example, by means of the notifyDelivery( ) delivery machine interface, the ExpiryDate is calculated using the above-mentioned method and the notification is made to the Parcel Object. Thus, the create method contains the ExpiryDate. Each LogisticPartner can have different calculation rules for the ExpiryDate.

In the case of COD parcels, a COD object 244 is dispensed, while packages and parcels without COD are generated by a create method without COD. In the case of parcels, the IdentCode of the parcel is transferred in the create method. In addition, the Parcel Object is informed about which LogisticPartner 230 it belongs to. This information is necessary for the capacity planning.

The history is maintained by the database using a trigger that transmits the old data record to an archive table before changing a data record. The getHistory( ) method provides a listing of the status of all archive entries.

The delivery machine configuration and the capacity management are preferably likewise integrated into the logistic system 100 as modular components.

The delivery machines of the postal service customers system make available a fixed number of boxes of different sizes for storage. The boxes are used by different logistic companies. Referring back to FIG. 7B, since the allocation of the delivery machine boxes among the logistic companies should be known for purposes of the parcel handling as well as for the cost calculation, delivery machine configurations are administered in an EJB DeliveryMachine 246. The EJB allows the setting and querying of the box configurations of each delivery machine as well as the calculation of the current and future filling with parcels.

Referring to FIGS. 7C and 8, the actual box configuration, that is to say, the number of boxes rented by a logistic partner broken down by box size, is represented by two EJBs BoxTypeQuantity 248 and BoxType 250. The DeliveryMachine 246 allocates each logistic partner a certain amount of BoxTypeQuantity 248 EJBs, namely, one for each rented box size. Each BoxTypeQuantity 248 stores the type and number of rented boxes. The box size is stored in its own EJB with the name BoxType 250.

Due to the modular structure of the parcel box system 10 used as well as of the logistic system 100, additional components can be integrated at any point in time. For example, it is possible to provide additional components for evaluation functions. Examples of such a data evaluation functionality are evaluations of the parcel data and customer data for statistical purposes.

Figure 9:
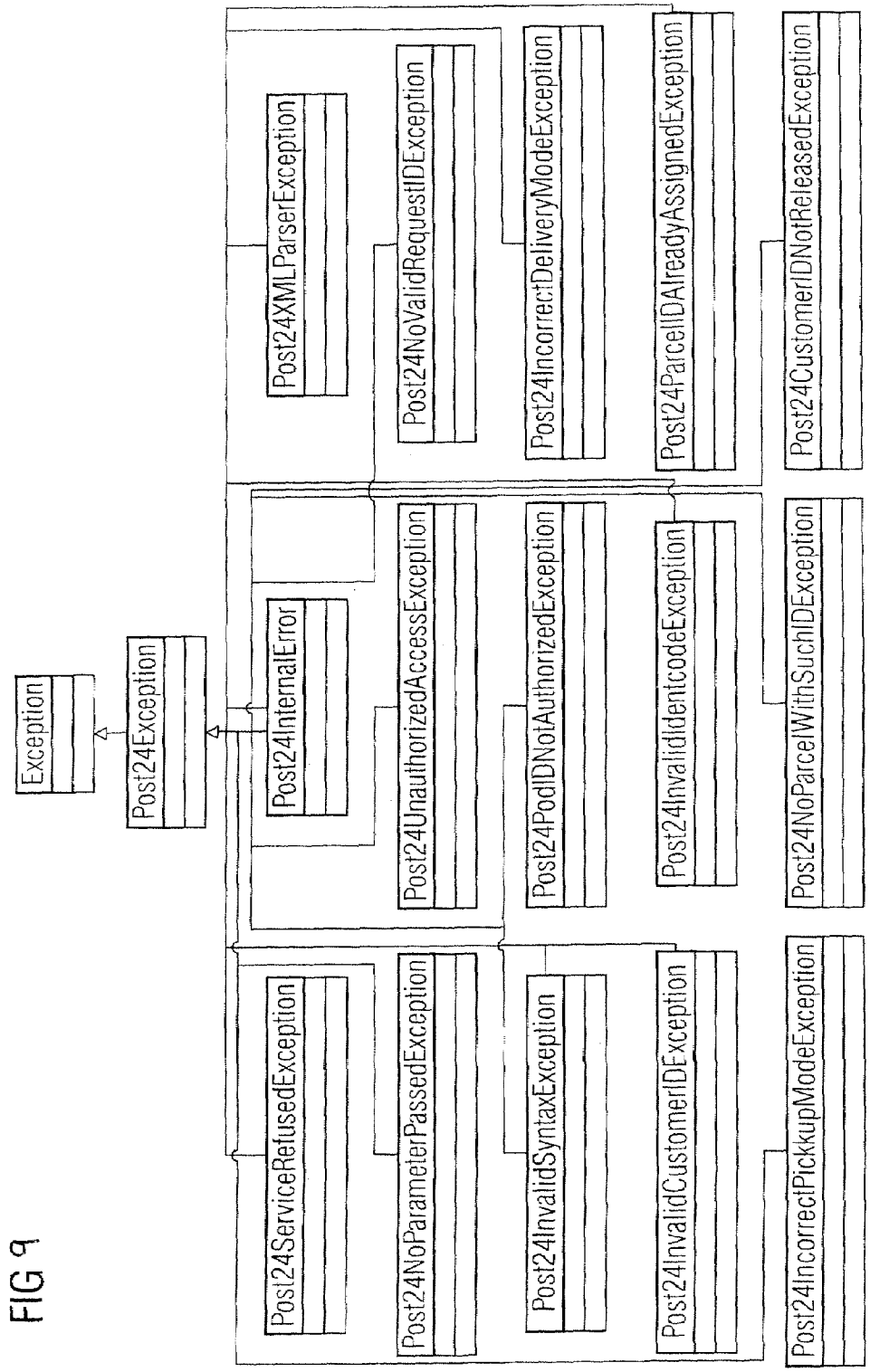

Referring to FIG. 9, protocolling (logging) is advantageous, especially for checking the proper functioning. The logging classes provided by the application server are used to log errors that have occurred. These are encapsulated for greater usefulness.

For example, the class de.Post24.util.P24Log provides a statistical logging method:

```
public static void log  (int severity,
            java.lang.String system,
            Java.lang.String msg,
            java.lang.Throwable t)
```

The meanings here are:

| | |
|---|---|
| severity | severity of the error. Four error classes are distinguished, which can be called up via constants within the P24Log class: P24Log.debug, P24Log.info, P24Log.warning, P24Log.error |
| system | name of the partial system |
| msg | error text to be stored |
| t | exception |

Simpler "lean" versions of this method are likewise possible, preferably by replacing certain parameters by predefined values, for example:

| | |
|---|---|
| severity | P24Log.debug |
| system | name of the partial system |
| t | not applicable |

Using the techniques shown, an adaptation of the configuration parameters can be done quickly and reliably.

The person skilled in the art can replace embodiments used in this presentation by substituting functionalities of other programming languages and program functions.

In the preferred programming language java, it is also possible to use other functionalities than the ones mentioned. In particular, it is advantageous for the person skilled in the art to use the process steps known from the other documents, such as, for example, http://java.sun.com/docs/codeconv/ (Java Coding Conventions), for the implementation of additional functions and for modifying and improving the functions employed.

The foregoing description is given for clearness of understanding only, and no unnecessary limitations should be understood therefrom, as modifications within the scope of the disclosure may be apparent to those having ordinary skill in the art.

What is claimed is:

1. An electronic parcel box device comprising:
   (a) at least two operating units;
   (b) a plurality of electronic parcel boxes, several of which are associated with one of the operating units;
   (c) each operating unit comprising at least a control means for controlling the opening and/or the closing of the parcel boxes associated with the operating units; and
   (d) a central control unit for controlling the operating units, the central control unit comprising an interface for flexibly associating the parcel boxes with the operating units, thereby associating the control means of each operating unit for controlling the opening and/or closing of the parcel boxes to a different group of parcel boxes.

2. The electronic parcel box system of claim 1, wherein the parcel boxes associated with a malfunctioning operating unit of an electronic parcel box device are associated with another operating unit of said electronic parcel box device.

3. A logistic system comprising:
   (a) several electronic parcel box devices networked with each other, each electronic parcel box devices comprising:
   at least two operating units;
   a plurality of electronic parcel boxes, several of which are associated with one of the operating units of said electronic parcel box device; and
   a central control unit for controlling the operating units, the central control unit comprising an interface for flexibly associating the parcel boxes with the operating units of said electronic parcel box device;
   (b) a central database server comprising memory for storing data about the filling status of the parcel box devices and a transmitter for transmitting the data, wherein postal parcels are delivered to individual electronic parcel box devices as a function of the filling status of the electronic parcel box devices.

* * * * *

UNITED STATES PATENT AND TRADEMARK OFFICE
CERTIFICATE OF CORRECTION

| | | |
|---|---|---|
| PATENT NO. | : 7,348,874 B2 | Page 1 of 1 |
| APPLICATION NO. | : 10/821107 | |
| DATED | : March 25, 2008 | |
| INVENTOR(S) | : Boris Mayer et al. | |

It is certified that error appears in the above-identified patent and that said Letters Patent is hereby corrected as shown below:

On the Cover Page:

At field (30), "101 49 637" should be -- 101 49 637.0 --.

Signed and Sealed this

Seventeenth Day of May, 2011

David J. Kappos
*Director of the United States Patent and Trademark Office*